(12) United States Patent
Park et al.

(10) Patent No.: US 12,017,581 B2
(45) Date of Patent: Jun. 25, 2024

(54) LAMP CONTROL SYSTEM AND METHOD FOR VEHICLES

(71) Applicants: Hyundai Motor Company, Seoul (KR); Kia Corporation, Seoul (KR)

(72) Inventors: Sung Ho Park, Seoul (KR); Dong Eun Cha, Hwaseong-si (KR); In Ho Jung, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 17/945,479

(22) Filed: Sep. 15, 2022

(65) Prior Publication Data

US 2023/0191990 A1 Jun. 22, 2023

(30) Foreign Application Priority Data

Dec. 22, 2021 (KR) .......................... 10-2021-0185032

(51) Int. Cl.
| | | |
|---|---|---|
| *B60Q 3/53* | (2017.01) | |
| *B60Q 3/74* | (2017.01) | |
| *B60Q 3/76* | (2017.01) | |
| *B60Q 3/80* | (2017.01) | |
| *F21V 7/00* | (2006.01) | |

(Continued)

(52) U.S. Cl.
CPC .................. *B60Q 3/53* (2017.02); *B60Q 3/74* (2017.02); *B60Q 3/76* (2017.02); *B60Q 3/80* (2017.02); *F21V 7/0016* (2013.01); *F21V 21/35* (2013.01); *H05B 47/115* (2020.01)

(58) Field of Classification Search
CPC ... B60Q 3/53; B60Q 3/74; B60Q 3/76; B60Q 3/80; B60Q 3/51; B60Q 3/60; F21V 7/0016; F21V 21/35; H05B 47/115; B60R 16/023; F16H 7/02
See application file for complete search history.

(56) References Cited

U.S. PATENT DOCUMENTS 10,800,326 B2 10/2020 Kastner et al.
2022/0228735 A1* 7/2022 Hendler .................. F21S 8/066

FOREIGN PATENT DOCUMENTS

JP H05155290 A * 6/1993 ............... B60Q 3/53
JP 2021-075065 A 5/2021
(Continued)

OTHER PUBLICATIONS

Translation of JP H05155290 A; Yamaguchi (Year: 1993).*

*Primary Examiner* — Renan Luque
(74) *Attorney, Agent, or Firm* — Morgan, Lewis & Bockius LLP

(57) ABSTRACT

A lamp control system for vehicles includes a rail provided on a roof of a vehicle and configured to extend in a longitudinal direction, a lamp module slidably connected to the rail to slide in a direction of extension of the rail, and including lamps configured to emit light to an interior of the vehicle, a sensing unit configured to detect the number of passengers riding in the vehicle, positions of the passengers, or a position of cargo loaded in the vehicle, and a controller electrically connected to the lamp module and the sensing unit and configured to control operation of the lamp module based on the number and the positions of the passengers or the position of the loaded cargo, detected by the sensing unit.

17 Claims, 16 Drawing Sheets

(51) Int. Cl.
*F21V 21/35* (2006.01)
*H05B 47/115* (2020.01)

(56) References Cited

FOREIGN PATENT DOCUMENTS

| | | |
|---|---|---|
| KR | 10-1430189 B1 | 8/2014 |
| KR | 10-2017-0064664 A | 6/2017 |

* cited by examiner

FIG. 4A                    FIG. 4B

LAMP CONTROL SYSTEM AND METHOD FOR VEHICLES

CROSS-REFERENCE TO RELATED APPLICATION

The present application claims priority to Korean Patent Application No. 10-2021-0185032, filed on Dec. 22, 2021, the entire contents of which is incorporated herein for all purposes by this reference.

BACKGROUND OF THE PRESENT DISCLOSURE

Field of the Present Disclosure

The present disclosure relates to a lamp control system and method for vehicles, and more particularly, to technology that controls operation of a lamp module provided in the interior of a vehicle.

Description of Related Art

Recently, as purposes of use of vehicles are being diversified, vehicle manufacturers can manufacture purpose-built vehicles (PBVs), i.e., vehicles which are manufactured based on purposes of use thereof.

When a PBV is manufactured, a basic platform for vehicles is the same, but kinds of internal parts disposed in the interior of the PBV may be diversified depending on the purpose of use of the PBV.

For example, in case that the PBV is a general vehicle or a ride-hailing vehicle, such as a taxi, a plurality of seats fit into the size of the PBV may be mounted, and in case that the PBV is a cargo vehicle used to transport cargo, only a driver seat may be disposed and a load space in which cargo is loaded may be formed in the interior of the vehicle.

Therefore, the positions of passengers riding in a vehicle or the position of cargo loaded in the vehicle is varied depending on the kind of the vehicle and thus operation of lamps needs to be changed, and accordingly, a lamp control system is required.

The information included in the present Background of the present disclosure section is only for enhancement of understanding of the general background of the present disclosure and may not be taken as an acknowledgement or any form of suggestion that the present information forms the prior art already known to a person skilled in the art.

BRIEF SUMMARY

Various aspects of the present disclosure are directed to providing a lamp control system for vehicles which includes a rail provided on a loop portion of the interior of a vehicle to extend the longitudinal direction, and a lamp module mounted on the rail, is operated to change operation of the lamp module and the position of the lamp module by sensing the number of passengers located inside the vehicle, the positions of the passengers or the position of cargo, and thus provides convenience to the passengers.

In accordance with an aspect of the present disclosure, the above and other objects may be accomplished by the provision of a lamp control system for vehicles including a rail provided on a roof of a vehicle and configured to extend in a longitudinal direction, a lamp module slidably connected to the rail to slide in a direction of extension of the rail, and including lamps configured to emit light to an interior of the vehicle, a sensing unit configured to detect the number of passengers riding in the vehicle, positions of the passengers or a position of cargo loaded in the vehicle, and a controller electrically connected to the lamp module and the sensing unit and configured to control operation of the lamp module based on the number of the passengers, the positions of the passengers or the position of the loaded cargo, detected by the sensing unit.

The lamp module may include a connector configured to slidably connect the lamp module to the rail, power input units extending along the rail in the longitudinal direction so that power is input to the power input units and signal transmitters electrically connected to the controller and configured to transmit an operating signal of the lamp module may be provided at a portion of the rail to which the connector is connected, and power receivers connected to the power input units and signal receivers connected to the signal transmitters may be provided on the connector.

The power receivers and the signal receivers may be formed as rollers, and thus, when the lamp module slides on the rail, power input and control signal input may be maintained.

An insert space configured so that the lamp module and the connector are inserted thereinto may be provided in the rail, the connector may include engaging portions protruding outwards to protrude in a direction intersecting the longitudinal direction at an inlet of the insert space, the connector may be rotated after being inserted into the insert space so that the engaging portions are disposed in the direction intersecting the longitudinal direction of the rail inside the insert space and is thus engaged with the insert space of the rail, and accordingly, the connector may be coupled to the rail.

The lamp control system for vehicles may further include an actuator provided on the rail and connected to the lamp module through the connector to slide the lamp module on the rail in the longitudinal direction of the rail, and the controller may be configured to control the actuator to slide the lamp module on the rail based on the number of the passengers, the positions of the passengers or the position of the loaded cargo, detected by the sensing unit.

The actuator may include a driving motor configured to rotate an output shaft, pulleys, at least one of which is connected to the output shaft of the driving motor, and driving belts wound on the pulleys, and the connector may include belt rollers engaged to the driving belts.

The driving belts may be disposed to extend in the longitudinal direction of the rail by a pair of the pulleys provided at first and second end portions of the driving belts, and the belt rollers may include upper rollers coupled to upper portions of the driving belts, and lower rollers coupled to lower portions of the driving belts.

The insert space configured so that the lamp module is inserted thereinto may be provided in the rail, the upper rollers may be coupled to the lamp module so that rotation shafts of the upper rollers are rotated in the direction intersecting the longitudinal direction of the rail, and may be rotated to be connected to the rail after being inserted into the insert space, the lower rollers provided such that lengths of rotation shafts thereof are adjusted may be inserted into the insert space in a state in which the lengths of the rotation shafts are reduced, and then, the rotation shafts of the lower rollers may extend to positions corresponding to the driving belts.

A first elastic body may be provided between the connector and the rotation shafts of the upper rollers to apply elastic force upwards, a handle configured to pass through the lamp module and connected to the rotation shafts of the upper rollers may be provided to rotate the upper rollers, and each of the lower rollers may include a second elastic body provided between a corresponding one of the lower rollers and the connector to apply elastic force in a direction of extension of a rotation shaft of the corresponding one of the lower rollers.

The connector may include a coupling portion provided in a direction intersecting the longitudinal direction of the rail and configured to open an inlet of the connector when the connector is connected to the rail, and a third elastic body provided between the coupling portion and the connector and configured to narrow the open inlet by elasticity to fix coupling between the rail and the connector.

At least one direct lamp configured to emit light downwards or at least one indirect lamp configured to emit light so that the emitted light is reflected by an internal trim of the vehicle may be provided in or on the lamp module.

A plurality of direct lamps or a plurality of indirect lamps may be disposed depending on a kind of the vehicle to which the lamp control system for vehicles is applied or the number of seats in the vehicle.

The lamp control system for vehicles may further include an input unit configured so that an illumination mode is input thereto, and the controller may be configured to control operation of the at least one direct lamp or the at least one indirect lamp depending on the illumination mode input through the input unit.

In accordance with another aspect of the present disclosure, there is provided a method for controlling the above-described lamp control system for vehicles, the method including sensing the number of the passengers riding in the vehicle, the positions of the passengers or the position of the cargo loaded in the vehicle, and controlling operation of the lamp module based on the number of the passengers, the positions of the passengers or the position of the loaded cargo, detected in the sensing the number of the passengers, the positions of the passengers or the position of the loaded cargo.

The lamp module may include at least one direct lamp configured to emit light downwards or at least one indirect lamp configured to emit light so that the emitted light is reflected by an internal trim of the vehicle, the method may further include inputting an illumination mode selected by a passenger, and in the controlling the operation of the lamp module, operation of the at least one direct lamp and the at least one indirect lamp may be controlled based on the selected illumination mode.

The method may further include controlling operation of the actuator, coupled to the lamp module and configured to slide the lamp module on the rail, to move the lamp module based on the number of the passengers, the positions of the passengers or the position of the loaded cargo, detected in the sensing the number of the passengers, the positions of the passengers or the position of the loaded cargo.

The methods and apparatuses of the present disclosure have other features and advantages which will be apparent from or are set forth in more detail in the accompanying drawings, which are incorporated herein, and the following Detailed Description, which together serve to explain predetermined principles of the present disclosure.

Figure 1:
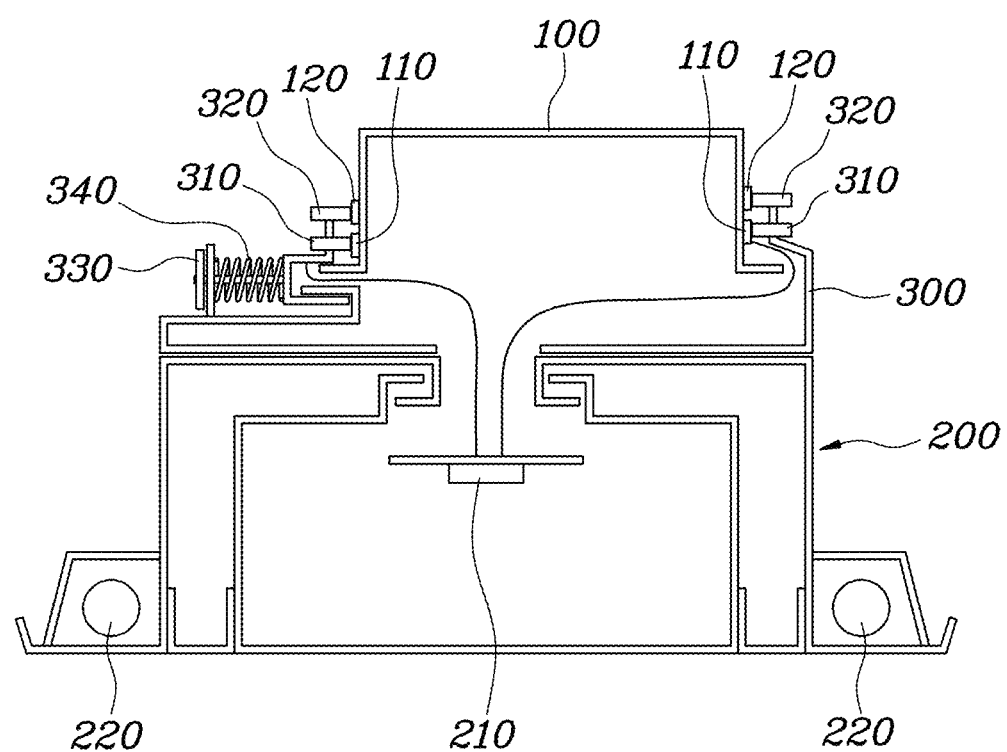
FIG. 1 is a longitudinal-sectional view exemplarily illustrating a lamp control system for vehicles according to various exemplary embodiments of the present disclosure, to which both a direct lamp and an indirect lamp are applied.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments, it will be understood that the present description is not intended to limit the present disclosure(s) to those exemplary embodiments of the present disclosure. On the other hand, the present disclosure(s) is/are intended to cover not only the exemplary embodiments, but also various alternatives, modifications, equivalents and other embodiments, which may be included within the spirit and scope of the present disclosure as defined by the appended claims.

Specific structural or functional descriptions in embodiments of the present disclosure set forth in the description which follows will be exemplarily given to describe the exemplary embodiments of the present disclosure. However, the present disclosure may be embodied in many alternative forms, and should not be construed as being limited to the exemplary embodiments set forth herein.

The exemplary embodiments of the present disclosure may be variously modified and changed, and thus specific embodiments of the present disclosure will be illustrated in the drawings and described in detail in the following description of the exemplary embodiments of the present disclosure. However, it will be understood that the exemplary embodiments of the present disclosure are provided only to completely include the present disclosure and cover modifications, equivalents or alternatives which come within the scope and technical range of the present disclosure.

In the following description of the embodiments, terms, such as "first" and "second", are used only to describe various elements, and these elements should not be construed as being limited by these terms. These terms are used only to distinguish one element from other elements. For example, a first element described hereinafter may be termed a second element, and similarly, a second element described hereinafter may be termed a first element, without departing from the scope of the present disclosure.

When an element or layer is referred to as being "connected to" or "coupled to" another element or layer, it may be directly connected or coupled to the other element or layer, or intervening elements or layers may be present. In contrast, when an element or layer is referred to as being "directly connected to" or "directly coupled to" another element or layer, there may be no intervening elements or layers present. Other words used to describe relationships between elements should be interpreted in a like fashion, e.g., "between" versus "directly between," "adjacent" versus "directly adjacent," etc.

The terminology used herein is for describing various exemplary embodiments only and is not intended to be limiting. As used herein, singular forms may be intended to include plural forms as well, unless the context clearly indicates otherwise. The terms "comprises," "comprising," "including," and "having" are inclusive and therefore specify the presence of stated features, integers, steps, operations, elements, components, and/or combinations thereof, but do not preclude the presence or addition of one or more other features, integers, steps, operations, elements, components, and/or combinations thereof.

Unless defined otherwise, all terms including technical and scientific terms used in the following description have the same meanings as those of terms generally understood by those skilled in the art. Terms defined in generally used dictionaries will be interpreted as having meanings coinciding with contextual meanings in the related technology, and are not to be interpreted as having ideal or excessively formal meanings unless defined clearly in the description.

Hereinafter, reference will now be made in detail to the exemplary embodiments of the present disclosure, examples of which are illustrated in the accompanying drawings. Wherever possible, the same reference numbers will be used throughout the drawings to refer to the same or like parts.

A sensing unit 10, a controller 20 and an input unit 30 according to exemplary embodiments of the present disclosure may be implemented through a non-volatile memory configured to store an algorithm configured to control operations of various elements of a vehicle or data regarding software commands for reproducing the algorithm and a processor configured to perform operations which will be described below using data stored in the corresponding memory. Here, the memory and the processor may be implemented as individual chips. Alternatively, the memory and the processor may be implemented as a single integrated chip. The processor may be provided in a form of one or more processors.

Figure 2:
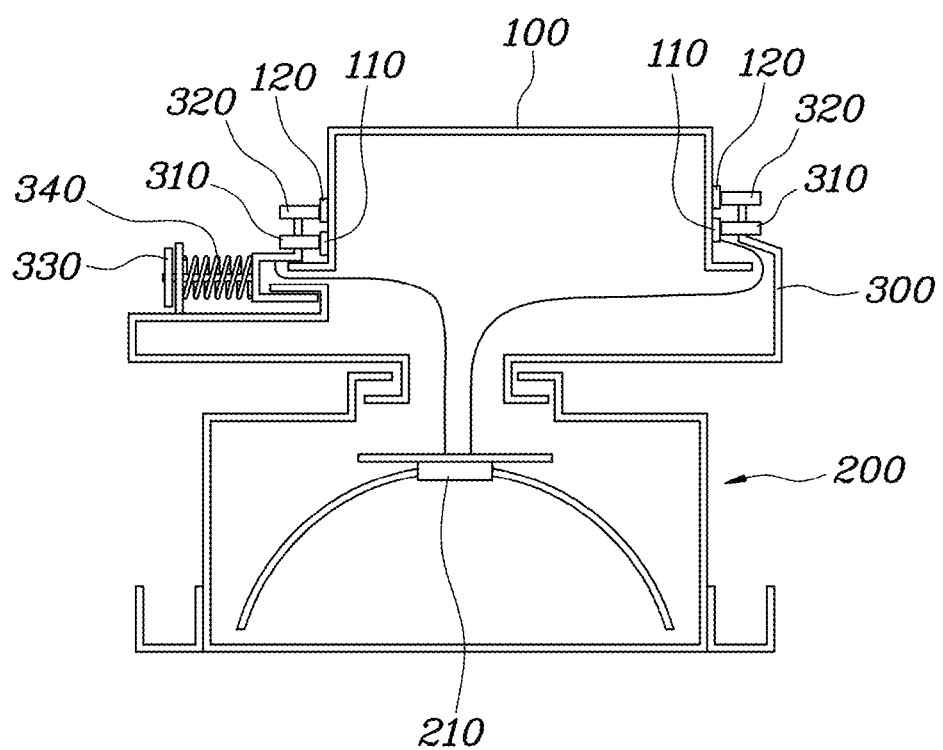
FIG. 2 is a longitudinal-sectional view exemplarily illustrating a lamp control system for vehicles according to various exemplary embodiments of the present disclosure, to which a direct lamp alone is applied.
Figure 3:
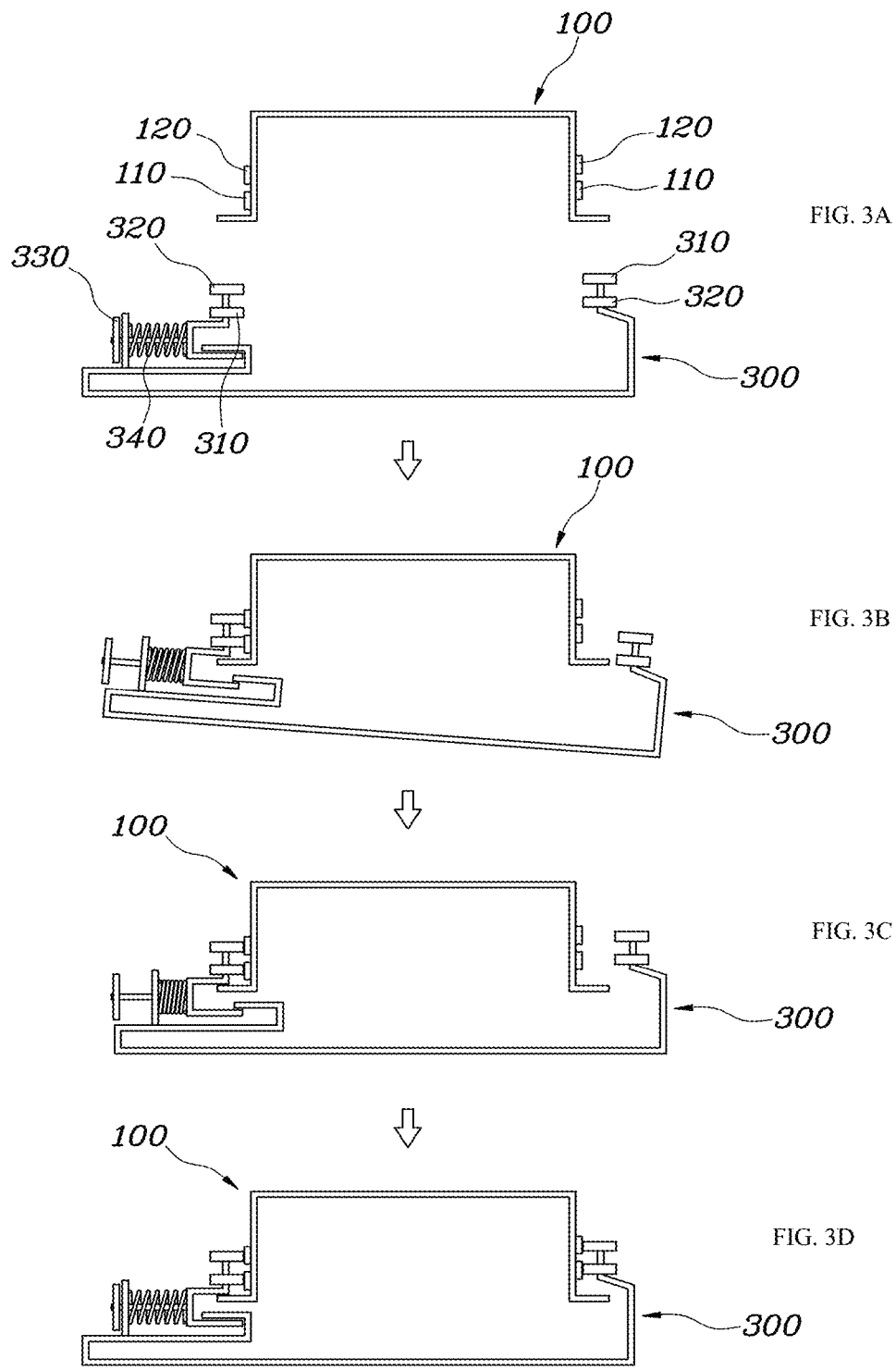
FIG. 3A, FIG. 3B, FIG. 3C and FIG. 3D are longitudinal-sectional views exemplarily illustrating a process of coupling a connector to a rail in the lamp control systems for vehicles according to the various exemplary embodiments.
Figure 4:
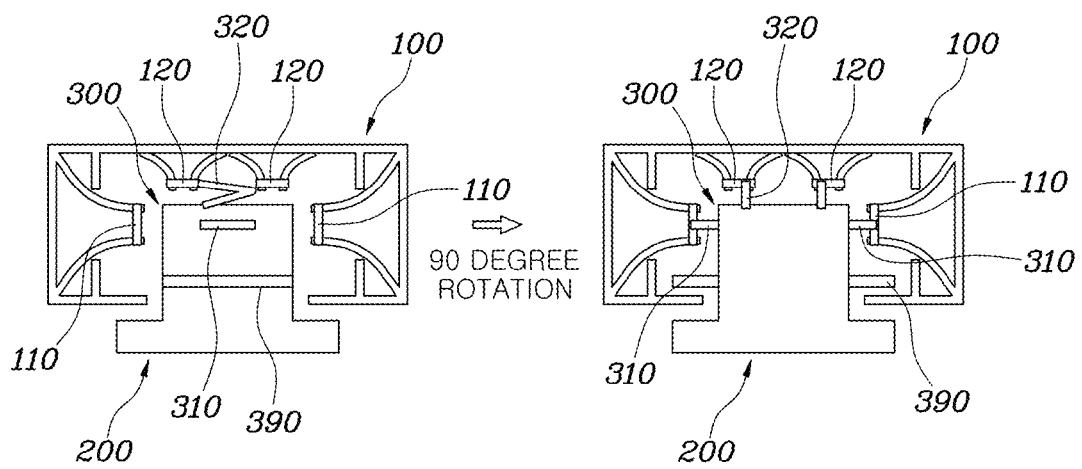
FIG. 4A and FIG. 4B are longitudinal-sectional views exemplarily illustrating a lamp control system for vehicles according to various exemplary embodiments of the present disclosure.
Figure 5:
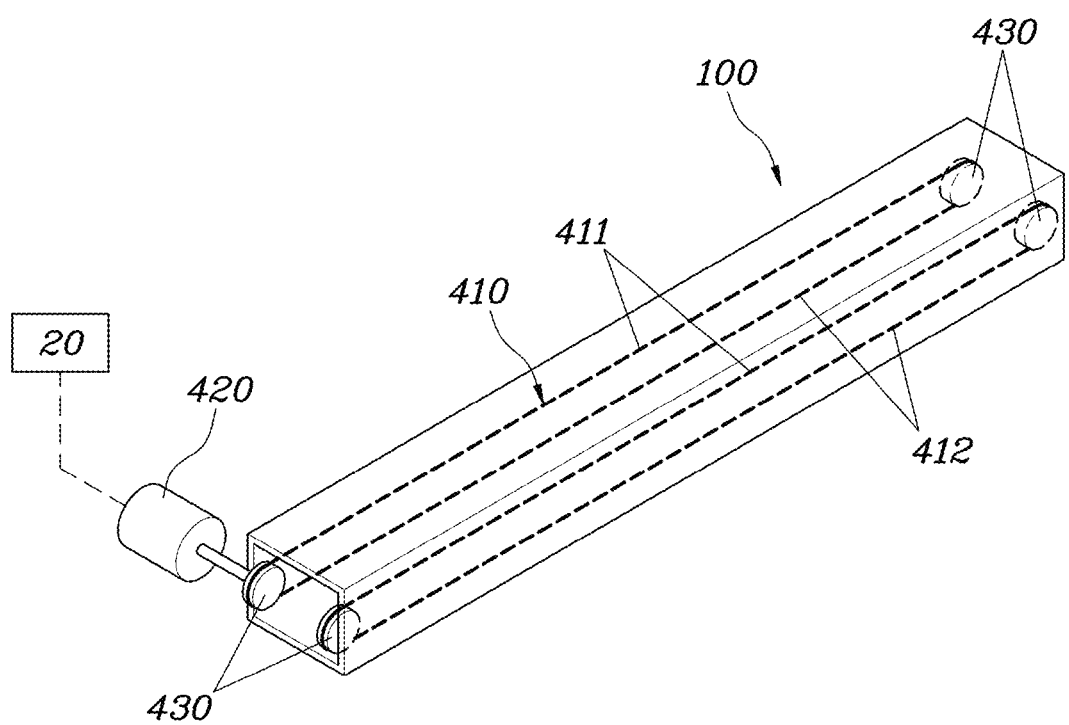
FIG. 5 is a perspective view exemplarily illustrating an actuator applied to the rail of the lamp control system for vehicles according to an exemplary embodiment of the present disclosure.
Figure 6A:
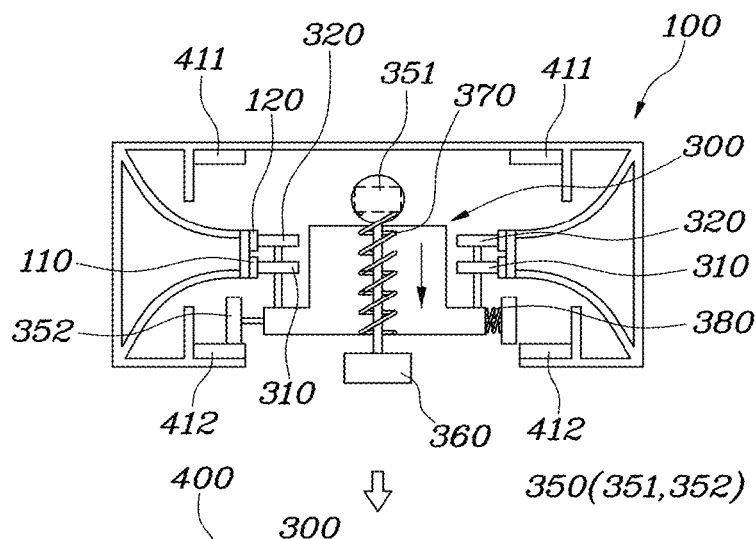
FIG. 6A, FIG. 6B, FIG. 6C and FIG. 6D are longitudinal-sectional views exemplarily illustrating a process of applying an actuator to a rail and connecting a connector to the rail in a lamp control system for vehicles according to the various exemplary embodiments of the present disclosure.
Figure 6B:
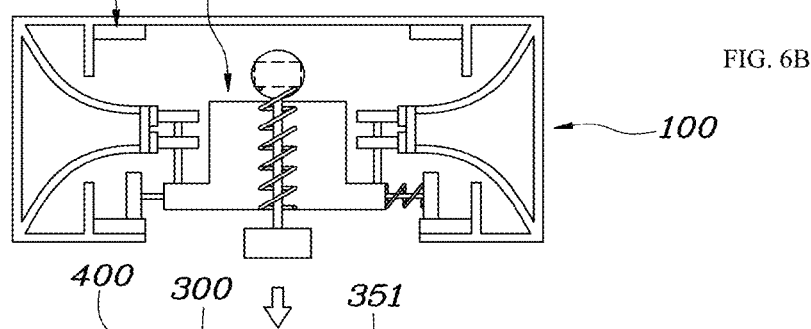
Figure 6C:
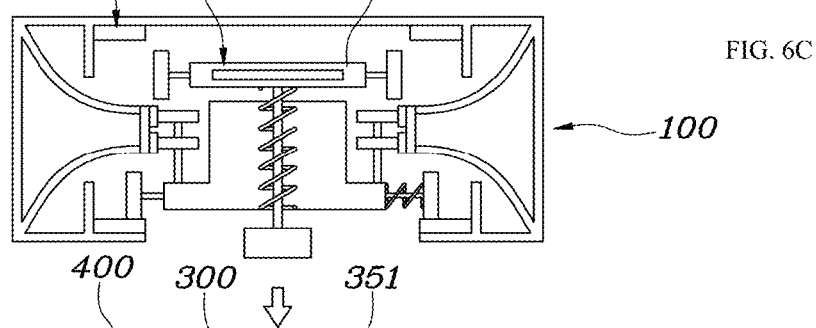
Figure 6D:
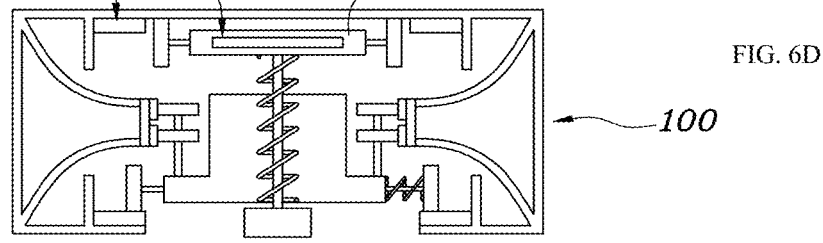
Figure 7A:
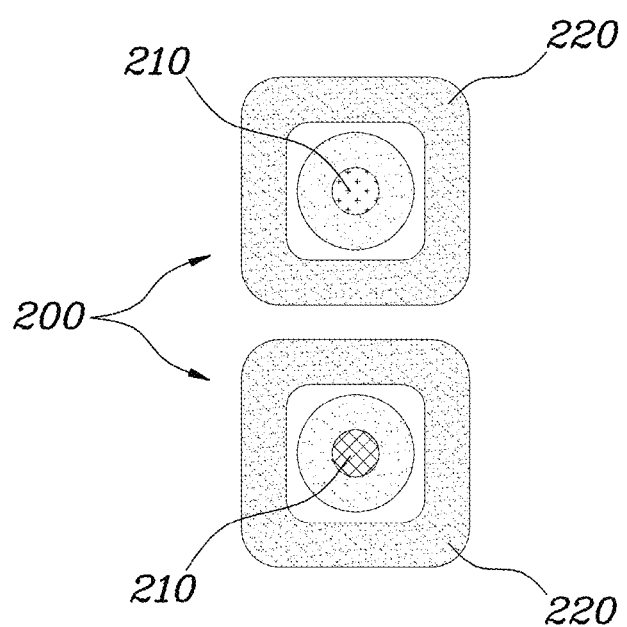
FIG. 7A, FIG. 7B and FIG. 7C are views exemplarily illustrating various examples lamp modules of the lamp control system for vehicles according to an exemplary embodiment of the present disclosure.
Figure 7B:
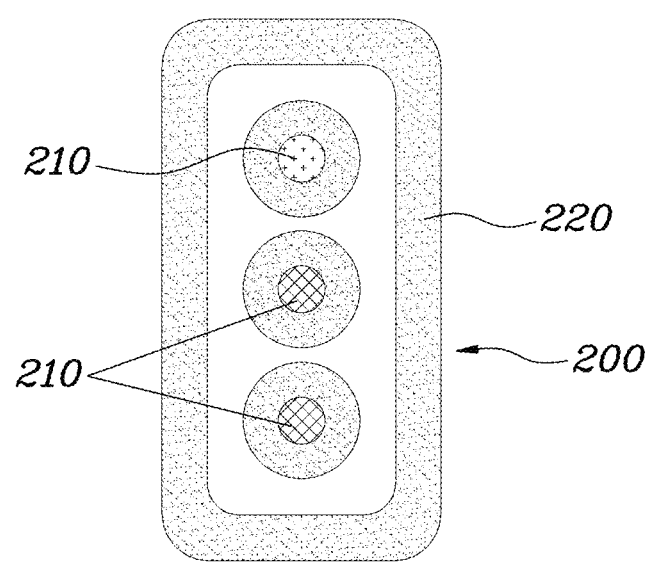
Figure 7C:
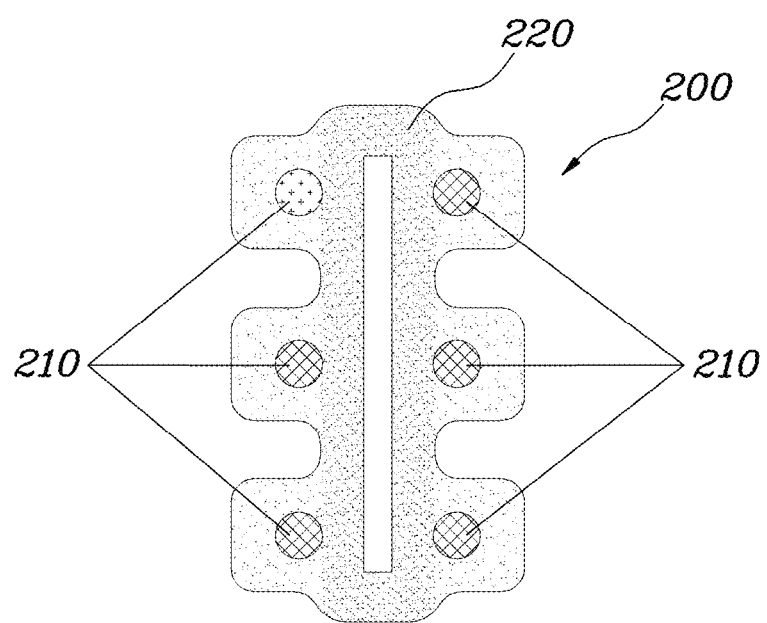
Figure 11:
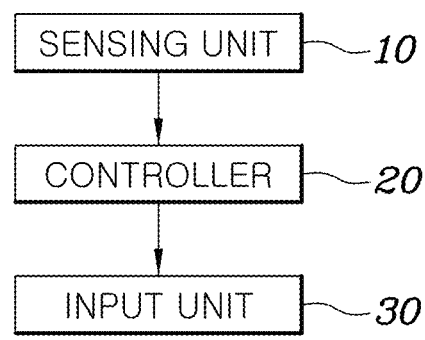
FIG. 11 is a block diagram of the lamp control system for vehicles according to an exemplary embodiment of the present disclosure.

FIG. 1 is a longitudinal-sectional view exemplarily illustrating a lamp control system for vehicles according to various exemplary embodiments of the present disclosure, to which both a direct lamp 210 and an indirect lamp 220 are applied, FIG. 2 is a longitudinal-sectional view exemplarily illustrating a lamp control system for vehicles according to various exemplary embodiments of the present disclosure, to which a direct lamp alone 210 is applied, FIG. 3A, FIG. 3B, FIG. 3C and FIG. 3D are longitudinal-sectional views exemplarily illustrating a process of coupling a connector 300 to a rail 100 in the lamp control systems for vehicles according to the various exemplary embodiments of the present disclosure, FIG. 4A and FIG. 4B are longitudinal-sectional views exemplarily illustrating a lamp control system for vehicles according to various exemplary embodiments of the present disclosure, FIG. 5 is a perspective view exemplarily illustrating an actuator 400 applied to the rail 100 of the lamp control system for vehicles according to an exemplary embodiment of the present disclosure, FIG. 6A, FIG. 6B, FIG. 6C and FIG. 6D are longitudinal-sectional views exemplarily illustrating a process of applying an actuator 400 to a rail 100 and connecting a connector 300 to the rail 100 in a lamp control system for vehicles according to the various exemplary embodiments of the present disclosure, FIG. 7A, FIG. 7B and FIG. 7C are views exemplarily illustrating various examples of lamp modules 200 of the lamp control system for vehicles according to an exemplary embodiment of the present disclosure, FIG. 8A and FIG. 8B, FIG. 9A, FIG. 9B and FIG. 9C and FIG. 10 are views exemplarily illustrating lamp control systems for vehicles according to various embodiments of the present disclosure, and FIG. 11 is a block diagram of the lamp control system for vehicles according to an exemplary embodiment of the present disclosure.

Lamp control systems for vehicles according to exemplary embodiments of the present disclosure will be described with reference to FIGS. 1 to 11.

Recently, as purposes of use of vehicles are being diversified, vehicle manufacturers can manufacture purpose-built vehicles (PBVs), i.e., vehicles which are manufactured based on purposes of use thereof.

When a PBV is manufactured, a basic platform for vehicles is the same, but kinds of internal parts disposed in the interior of the PBV may be diversified depending on the purpose of use of the PBV.

For example, in case that the PBV is a general vehicle or a ride-hailing vehicle, such as a taxi, a plurality of seats fit into the size of the vehicle may be mounted, and in case that the PBV is a cargo vehicle used to transport cargo, only a driver seat may be disposed and a load space in which cargo is loaded may be formed in the interior of the vehicle.

Therefore, the positions of passengers riding in a vehicle or the position of cargo loaded in the vehicle is varied depending on the kind of the vehicle and thus operation of lamps needs to be changed, and for the present purpose, the present disclosure has been devised.

A lamp control system for vehicles according to an exemplary embodiment of the present disclosure includes a rail 100 provided on the roof of a vehicle and configured to extend in the longitudinal direction, a lamp module 200 connected to the rail 100 to be slidable in a direction of extension of the rail 100 and configured to emit light to the interior of the vehicle, a sensing unit 10 configured to detect the number of passengers riding in the vehicle, the positions of the passengers or the position of cargo located in the vehicle, and a controller 20 configured to control operation of the lamp module 200 based on the number of the passengers, the positions thereof or the positions of the loaded cargo, detected by the sensing unit 10.

As shown in FIG. 1, FIG. 2, FIG. 3, and FIG. 4B, the rail 100 mounted on the internal surface of the roof of the vehicle may extend in the longitudinal direction, and may thus be disposed to extend in the leftward and rightward directions or in the forward and rearward directions of the vehicle.

The lamp module 200 coupled to the rail 100 may include lamps configured to emit light towards the passengers or the cargo located in the interior of the vehicle, and may be coupled to the rail 100 to be slidable in the direction of extension of the rail 100.

Various examples of the lamp module 200, which are coupled to the rail 100 to be slidable, will be described below.

As shown in FIGS. 9A to 11, the sensing unit 10 configured to detect the positions of seats on which passengers sits in the vehicle, and the sitting postures or the facing postures of the passengers may be provided, and the sensing unit 10 may detect the position of the cargo loaded in the load space of the vehicle besides the passengers.

The controller 20 may control operation of the lamp module 200 and may operate the lamps included in the lamp module 200 based on the positions of the seats on which the passengers sits in the vehicle, the sitting postures or the facing postures of the passengers or the position of the cargo, detected by the sensor 10.

Accordingly, the lamp control system for vehicles according to an exemplary embodiment of the present disclosure may automatically detect the positions of the seats on which the passengers sit in the vehicle, the sitting postures or the facing postures of the passengers or the position of the cargo, may correspondingly control operation of the lamps located on the roof of the vehicle to operate the lamps appropriated to the positions of the seats on which the passengers sit in the vehicle, the sitting postures or the facing postures of the passengers or the position of the cargo, being configured for providing convenience to the passengers and a driver.

The lamp module 200 may include a connector 300 configured to slidably connect the lamp module 200 to the rail 100, power input units 110 configured to extend along the rail 100 in the longitudinal direction thereof so that power is input to the power input units 110 and signal transmitters 120 connected to the controller 20 and configured to transmit the operating signal of the lamp module 200 may be provided at the portion of the rail 10 to which the connector 300 is connected, and power receivers 310 connected to the power input units 110 and signal receivers 320 connected to the signal transmitters 120 may be provided on the connector 300.

As shown in FIG. 1, FIG. 2, FIG. 3, and FIG. 4B, the connector 300 configured to slidably connect the lamp module 200 to the rail 100 may be provided, and the connector 300 may be electrically connected to the lamp module 200.

The power input units 110 connected to a power supply source of the vehicle may be provided on the rail 100, the upper portion of the lamp module 200 may be connected to the connector 300, the connector 300 and the lamp module 200 may be electrically connected, the power receivers 310 configured to supply power to the lamps may be provided at positions on the connector 300 corresponding to the power input units 110, and as the power input units 110 and the power receivers 310 come into contact with each other and are electrically connected to each other and thus power is applied from the power input units 110 to the power receivers 310, the lamps may receive power from a power supply device provided in the vehicle.

Furthermore, the signal transmitters 120 connected to the controller 20 to transmit a control signal may be provided on the rail 100, the signal transmitters 320 may be provided at the positions on the connector 300 corresponding to the signal transmitters 120, and thus, the control signal transmitted by the controller 20 may be transmitted to the lamp module 200 through the signal transmitters 120 and the signal receivers 320 to operate the lamp module 200.

The power receivers 310 and the signal receives 320 may be formed as rollers, and thus, when the lamp module 200 slides on the rail 100, power input and control signal input may be maintained.

As shown in FIG. 1 and FIG. 2, because the signal receivers 320 and the power receivers 310 are provided in a pair at both sides of the connector 300, power and the control signal may be received through a positive electrode and a negative electrode.

As the signal receivers 320 and the power receivers 310, which are respectively provided in a pair, are formed as rollers and the power input units 110 and the signal transmitters 120 extend in the longitudinal direction of the rail 100, the signal receivers 320 and the power receivers 310 are rotated in the state of being in contact with the power input units 110 and the signal transmitters 120 when the lamp module 200 slides on the rail 100, being configured for exhibiting an effect in which input of the control signal and power to the lamp module 200 is maintained.

In the various exemplary embodiments of the present disclosure, the connector 300 may include a coupling portion 330 provided in a direction intersecting the longitudinal direction of the rail 100 and configured to open an inlet of the connector 300 when the connector 300 is connected to the rail 100, and a third elastic body 340 provided between the coupling portion 330 and the connector 300 and configured to narrow the open inlet by elasticity to fix coupling between the rail 100 and the connector 300.

As shown in FIGS. 1 and 3D, as a first example of connection between the connector 300 configured to connect the lamp module 200 to the rail 100 and the rail 100, the coupling portion 330 provided on the connector 300 is moved in the direction intersecting the direction of extension of the rail 100 to open the inlet of the connector 300 at which the connector 300 and the rail 100 are connected, the rail 100 is inserted into the connector 300, and then, the third elastic body 340 connected to the coupling portion 330 in the direction of extension of the coupling portion 330 narrows the inlet of the connector 300 using elastic force, being configured for completing connection between the connector 300 and the rail 100.

Accordingly, attachment or detachment between the connector 300 and the rail 100 is convenient, and thus, it is convenient to repair and replace the rail 100, the connector 300 and the lamp module 200.

An insert space into which the lamp module 200 and the connector 300 are inserted is provided in the rail 100, the connector 300 includes engaging portions 390 configured to protrude outwards to protrude in the direction intersecting the longitudinal direction at an inlet of the insert space, the connector 300 is rotated after being inserted into the insert space so that the engaging portions 390 are disposed in the direction intersecting the longitudinal direction of the rail 100 inside the insert space and is thus engaged with the inserts space of the rail 100, and thereby, the connector 300 may be coupled to the rail 100.

As shown in FIG. 4, the insert space into which the lamp module 200 connected to the connector 300 is inserted may be formed in the rail 100, and the insert space may extend in the direction of extension of the rail 100.

Here, the lamp module 200 and the connector 300 may be inserted into the insert space of the rail 100, and may be connected to the rail 100 to slide on the rail 100.

As a second example of connection between the connector 300 and the rail 100, the engaging portions 390 which protrude outwards may be provided on the connector 300 such that the engaging portions 390 are provided in a pair and located on the external surface of the connector 300 to face each other, the engaging portions 390 provided in a pair may be disposed in the direction of extension of the rail 100 inside the insert space when the connector 300 is inserted into the insert space of the rail 100, and thereafter, the connector 300 may be rotated 90 degrees so that both engaging portions 390 are engaged with the inside of the insert space to prevent the connector 300 and the lamp module 200 from escaping from the insert space of the rail 100.

Furthermore, in the second example of connection between the connector 300 and the rail 100, the power input units 110 and the signal transmitters 120 may be provided in the insert space inside the rail 100, the signal receivers 320 may be provided at the upper portion of the connector 300, and the signal receivers 320 may be formed as spring-type metal plates including elasticity and may thus prevent the engaging portions 390 from escaping from the insert space due to formation of friction when the engaging portions 390 are engaged with the inside of the insert space. Furthermore, the power receivers 310, which are provided in a pair, may protrude outwards from the connector 300 in the same form as the engaging portions 390, and the power receivers 310 may be connected to the power input units 110 depending on 90 degree rotation of the connector 300.

Accordingly, in the state in which the connector 300 and the lamp module 200 are inserted into the insert space, the power receivers 310 come into contact with the power input units 110 and thus power may be applied to the lamp module 200, and the signal receivers 320 are connected to the signal receivers 120 and thus a control signal may be transmitted to the lamp module 200.

A lamp control system for vehicles according to the various exemplary embodiments of the present disclosure may further include an actuator 400 provided on the rail 100 and connected to the lamp module 200 through the connector 300 to slide the lamp module 200 on the rail 100 in the longitudinal direction of the rail 100, and the controller 20 may control the actuator 400 to slide the lamp module 200 on the rail 100 based on the number of passengers, the positions of the passengers or the position of loaded cargo, detected by the sensing unit 10.

As shown in FIG. 5 and FIG. 6A, FIG. 6B, FIG. 6C and FIG. 6D, the lamp module 200 slidably coupled to the rail 100 by the connector 300 is provided, and the actuator 400 is connected to the connector 300 to slide the lamp module 200 on the rail 100.

Here, the lamp module 200 may be moved to a position set by a designer, and the position may be set to a position corresponding to a seat.

Figure 8A:
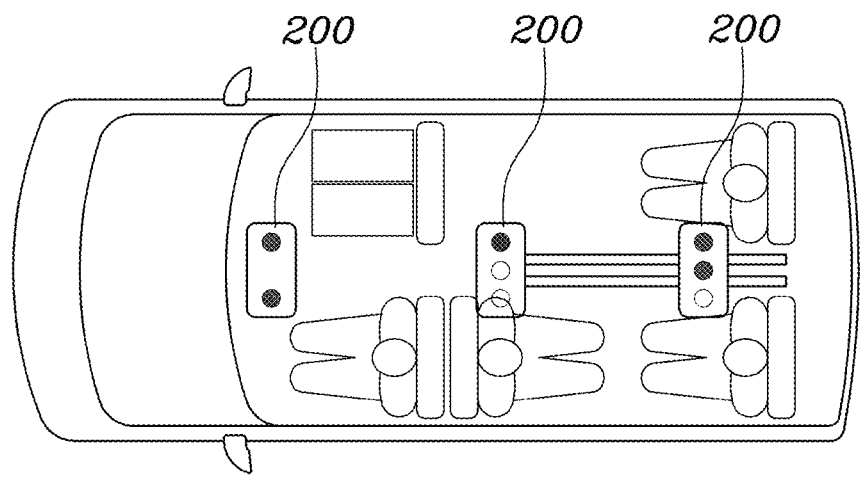
FIG. 8A and FIG. 8B, FIG. 9A, FIG. 9B and FIG. 9C and FIG. 10 are views exemplarily illustrating lamp control systems for vehicles according to various embodiments of the present disclosure.
Figure 8B:
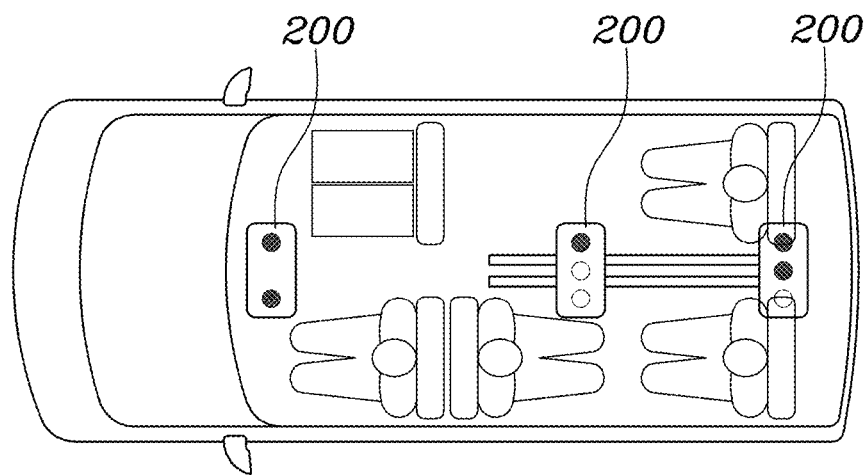
Figure 9A:
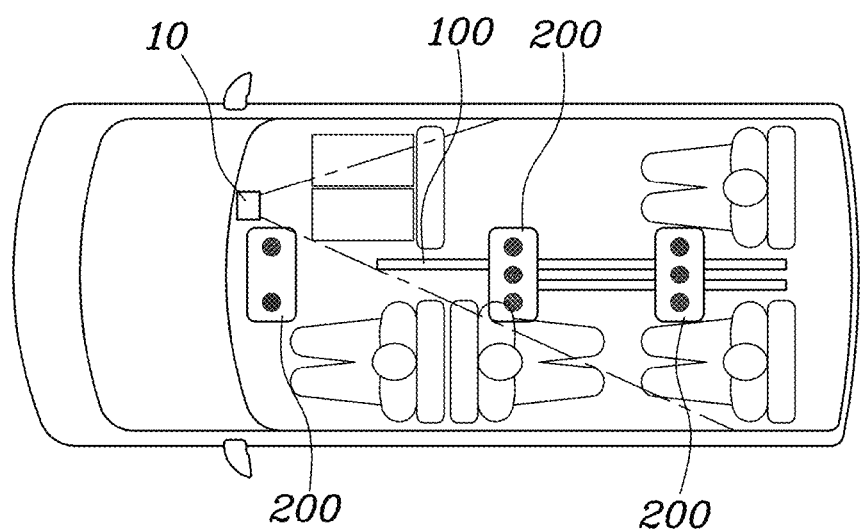
Figure 9B:
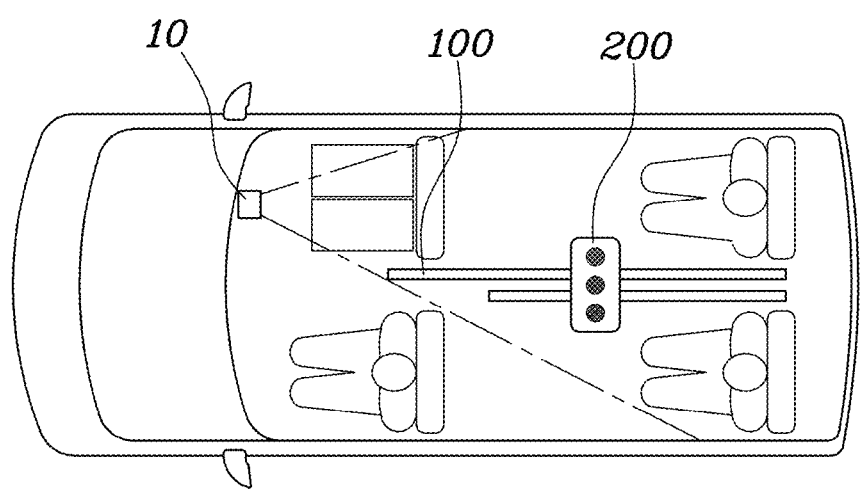
Figure 9C:
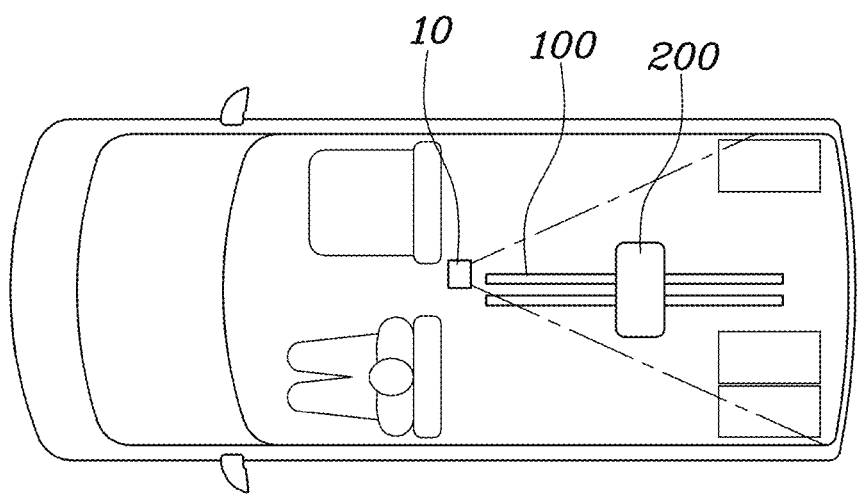
Figure 10:
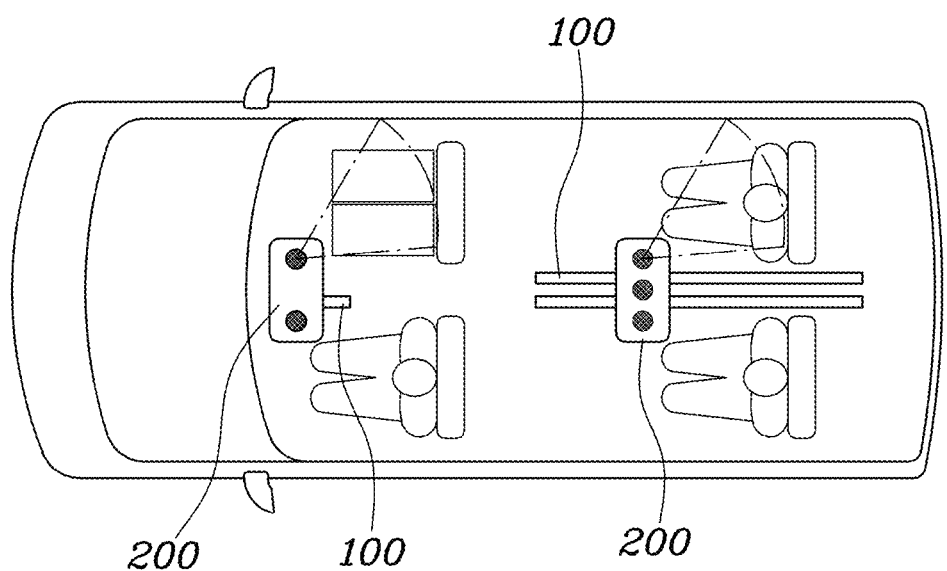

As shown in FIG. 8A and FIG. 8B, the lamp module 200 may be automatically moved by the actuator 400 depending on the position of a passenger riding in the vehicle, and thereby, when the passenger is changed to the facing posture or forward sitting posture by moving the seat on which the passenger sits, the lamp module 200 is moved to correspond to the position of the passenger, being configured for improving marketability of the vehicle and passenger convenience.

The actuator 400 may include a driving motor 420 configured to rotate an output shaft, pulleys 430 connected to the output shaft of the driving motor 420, and driving belts 410 wound on the pulleys 430, and the connector 300 may include belt rollers 350 connected to the driving belts 410.

Furthermore, as shown in FIG. 9A, FIG. 9B and FIG. 9C and FIG. 10, the sensing unit 10 may detect the positions of passengers and cargo, and the controller 20 may control the actuator 400 to move the lamp module 200 to the positions of the passengers, and may control the actuator 400 to operate the lamp module 200 at the position of the cargo after the vehicle is stopped, being configured for improving passenger convenience.

As shown in FIG. 5 and FIG. 6A, FIG. 6B, FIG. 6C and FIG. 6D, the driving belts 410 extending in the longitudinal direction in which the rail 100 extends may be provided in the rail 100, and the pulleys 430 may be provided at both end portions of the driving belts 410 and connected to the driving belts 410. When the driving belts 410 are moved, the belt rollers 350 connected to the driving belts 410 are moved and thus the connector 300 is moved, and then, the lamp module 200 connected to the connector 300 may be moved.

The driving belts 410 and the driving motor 420 are just an exemplary embodiment of the actuator 400, and various embodiments for moving the connector 300 and the lamp module 200 may be provided.

The driving belts 410 may be disposed to extend in the longitudinal direction of the rail 100 by a pair of pulleys 430 provided at both end portions of the driving belts 410, and the belt rollers 350 may include upper rollers 351 connected to the rail 100 provided thereabove, and lower rollers 352 connected to lower portions 412 of the driving belts 410.

As shown in FIG. 6A, FIG. 6B, FIG. 6C and FIG. 6D, the belt rollers 350 provided in the connector 300 are provided in a pair on the upper and lower portions of the connector 300, the upper rollers 351 located on the upper portion of the connector 300 may be connected to the rail 100 to slide thereon, and the lower rollers 352 provided on the lower portion of the connector 300 may come into contact with the lower portions 412 of the driving belts 410 to be moved depending on movement of the driving belts 410.

Here, because the upper rollers 351 do not come into contact with upper portions 411 of the driving belts 410 and thus do not interfere with the upper portions 411 of the driving belts 410, the connector 300 may be moved only by movement of the lower rollers 351 which come into contact with the lower portions 412 of the driving belts 410.

Accordingly, the connector 300 and the lamp module 200 may be moved by movement of the driving belts 410, formed as conveyer belts, by the driving motor 420.

The insert space into which the lamp module 200 is inserted is provided in the rail 100, the upper rollers 351 are coupled to the lamp module 200 so that the rotation shafts of the upper rollers 351 are rotated in the direction intersecting the longitudinal direction of the rail 100, and is rotated to positions corresponding to the driving belts 410 after being inserted into the insert space, and the lower rollers 352 provided such that the lengths of rotation shafts thereof are adjusted are inserted into the insert space in a state in which the lengths of the rotation shafts are reduced, and then, the rotation shafts of the lower rollers 352 extend to positions corresponding to the driving belts 410.

The connector 300 including the upper rollers 351 and the lower rollers 352 needs to be inserted into the insert space of the rail 100. Here, the belt rollers 350 may not be inserted into the inlet due to the width of the belt rollers 350, and to solve such a problem, the connector 300 may be inserted into the insert space in the state in which the upper rollers 351 are rotated in the direction parallel with the direction of extension of the rail 100 before insertion and the lengths of the rotation shafts of the lower rollers 352 are reduced.

Thereafter, after insertion of the connector 300 into the insert space has been completed, the upper rollers 351 may be rotated so that the rotation shafts of the upper rollers 351 are disposed parallel to the rotation shafts of the lower rollers 352, the upper rollers 351 may come into contact with the rail 100 located thereabove, and the rotation shafts of the lower rollers 352 may extend again and thus the lower rollers 352 may come into contact with the lower portions 412 of the driving belts 410.

Accordingly, the belt rollers 350 of the connector 300 inserted into the insert space may be connected to the driving belts 410 and the rail 100.

A first elastic body 370 may be provided between the lamp module 200 and the rotation shafts of the upper rollers 351 to apply elastic force upwards, a handle 360 which passes through the lamp module 200 and is connected to the rotation shafts of the upper rollers 351 may be provided to rotate the upper rollers 351, and each of the lower rollers 352 may include a second elastic body 380 provided between a corresponding one of the lower rollers 352 and the lamp module 200 to apply elastic force in the direction of extension of the rotation shaft of the corresponding one of the lower rollers 352.

To move the upper rollers 351, rotated after the connector 300 is inserted into the insert space, upwards to connect the upper rollers 351 to the rail 100, the upper rollers 351 may be moved upwards by the elastic force of the first elastic body 370 provided between the connector 300 and the upper rollers 351.

Here, the handle 360 which passes through the connector 300 and is connected to the upper rollers 351 is provided to rotate the upper rollers 351 in the state in which the upper rollers 351 are inserted into the insert space, and as a worker rotates the handle 360, the upper rollers 351 may be rotated, and may be moved upwards due to elastic force of the first elastic body 370.

Furthermore, the lengths of the rotation shafts of the lower rollers 352 are reduced in the axial direction by the worker, and when the pressure applied to the lower rollers 352 by the worker is removed after insertion into the insert space, the lengths of the rotation shafts of the lower rollers 352 may be extending by the elastic force of the second elastic bodies 380, and thus the lower rollers 352 may be moved to positions corresponding to the lower portions 412 of the driving belts 410.

The direct lamp 210 configured to emit light downwards or the indirect lamp 220 configured to emit light so that the light is reflected by the internal trim of the vehicle may be provided in or on the lamp module 200.

As shown in FIG. 1 and FIG. 2, the direct lamp 210 configured to directly emit light downwards or the indirect lamp 220 configured to emit light upwards or laterally so that the emitted light is reflected by the interior of the vehicle may be provided in or on the lamp module 200, and may be operated simultaneously or individually depending on a control signal of the controller 20.

Furthermore, depending on the kind of the vehicle, the lamp module 200 may be coupled to the rail 100 in the state in which the direct lamp 210 alone is applied to the lamp module 200, the indirect lamp 220 alone is applied to the lamp module 200, or both the direct lamp 210 and the indirect lamp 220 are applied to the lamp module 200.

Accordingly, various types of lamps may be applied to the lamp module 200 depending on needs in the vehicle, and thus, the manufacturing cost of the vehicle may be reduced.

A plurality of direct lamps 210 or a plurality of indirect lamps 220 may be disposed depending on the kind of a vehicle to which the lamp control system for vehicles according to an exemplary embodiment of the present disclosure is applied or the number of seats in the vehicle.

One of various combinations of the direct lamps 210 and the indirect lamps 220 may be applied in accordance with the kind of the vehicle, as shown in FIG. 7A, FIG. 7B and FIG. 7C.

One direct lamp 210 and one indirect lamp 220 provided to surround the direct lamp 210 may be disposed above the driver's seat or the front passenger seat of the vehicle, as shown in FIG. 7A, and a plurality of direct lamps 210 and an indirect lamp 220 configured to surround the direct lamps 210 may be disposed above the rear passenger seat of the vehicle to prepare for a case in which a lot of passengers sit on the rear passenger seat, as shown in FIGS. 7B and 7C.

The lamp control system for vehicles according to an exemplary embodiment of the present disclosure may further include an input unit 30 configured to input an illumination mode selected by a passenger, and the controller 20 may control operation of the direct lamp 210 or the indirect lamp 220 in accordance with the illumination mode selected through the input unit 30.

When a passenger gets into the vehicle, the lamp module 200 may be moved to a corresponding position and the lamps 210 and 220 may be operated automatically depending on sensing using the sensing unit 10. At the present time, the lamp module 200 may be operated in an initially set illumination mode.

When the input unit 30 connected to hardware, to which a passenger's intention is input, such as a touchpad or a button provided in the vehicle, confirms that a passenger's intention to change the illumination mode is input after the passenger gets into the vehicle, the controller 20 may change the position of the lamp module 20 to a predetermined position depending on the changed illumination mode, and such a position may be changed depending on design set by a designer.

For example, to adjust brightness step by step, both the direct lamp 210 and the indirect lamp 220 may be operated, the direct lamp 210 alone may be operated, the indirect lamp 220 alone may be operated, or all of the lamps 210 and 220 may be turned off.

Figure 12:
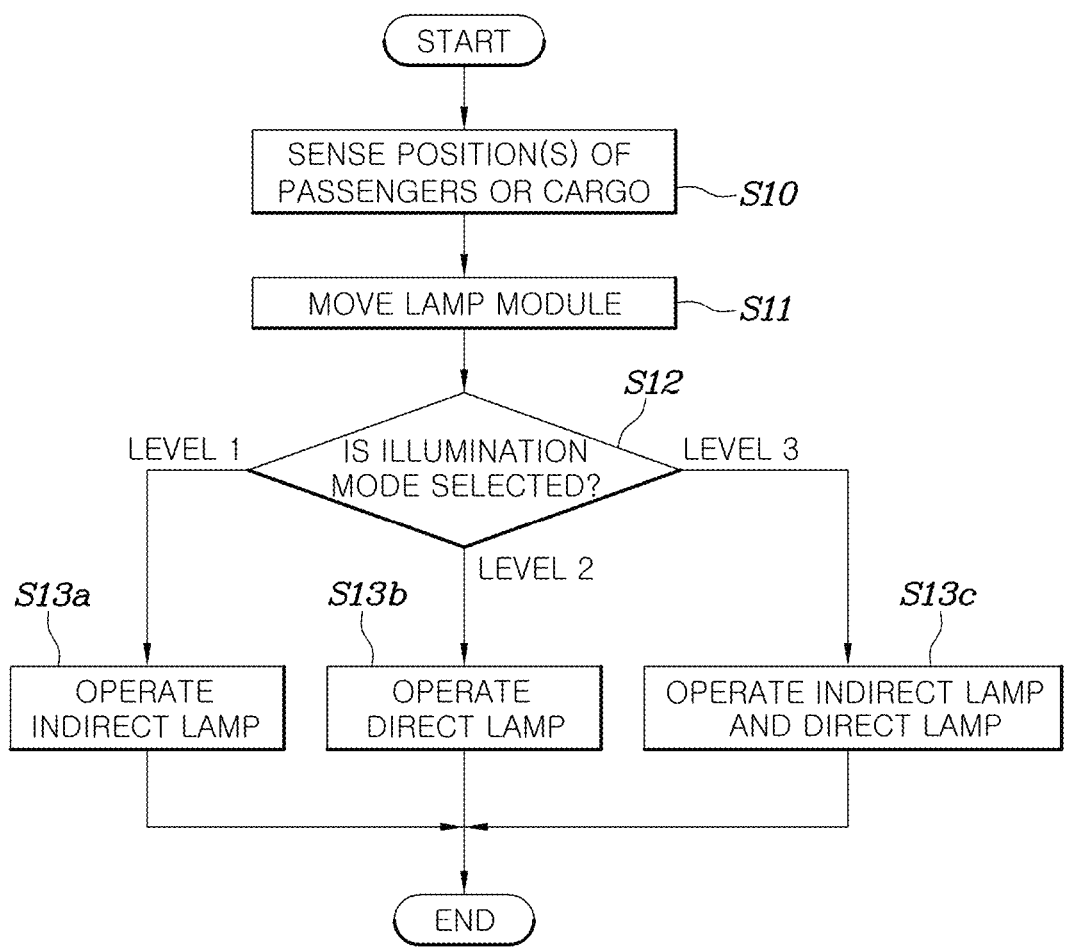
FIG. 12 is a flowchart representing a lamp control method for vehicles according to an exemplary embodiment of the present disclosure.

FIG. 12 is a flowchart representing a lamp control method for vehicles according to an exemplary embodiment of the present disclosure.

A lamp control method for vehicles according to an exemplary embodiment of the present disclosure will be described with reference to FIG. 12.

The lamp control method for vehicles according to an exemplary embodiment of the present disclosure includes sensing the number of passengers riding in a vehicle, the positions of the passengers or the position of cargo loaded in the vehicle (S10), and controlling operation of the lamp module 200 based on the number of the passengers, the positions of thereof or the positions of the loaded cargo, detected in Operation S10 (S13).

The lamp module 200 may include the direct lamp 210 configured to emit light downwards or the indirect lamp 220 configured to emit light so that the emitted light is reflected by the internal trim of the vehicle, the lamp control method for vehicles according to an exemplary embodiment of the present disclosure may further include inputting an illumination mode selected by the passenger (S12), and operation of the direct lamp 210 or the indirect lamp 220 may be controlled based on the selected illumination mode in the controlling the operation of the lamp module (S13).

In the controlling the operation of the lamp module (S13), the indirect lamp is operated if the selected illumination mode is a first level (S13a), the direct lamp is operated if the selected illumination mode is a second level (S13b), and the indirect lamp and the indirect lamp are operated if the selected illumination mode is a third level (S13c).

The lamp control method for vehicles according to an exemplary embodiment of the present disclosure may further include controlling operation of the actuator 400, coupled to the lamp module 200 and configured to slide the lamp module 200 on the rail 100, to move the lamp module 200 based on the number of the passengers, the positions thereof or the positions of the loaded cargo, detected in Operation S10 (S11).

As is apparent from the above description, a lamp control system for vehicles according to an exemplary embodiment of the present disclosure detects the number of passengers riding in the interior of a vehicle, the positions of the passengers or the position of cargo loaded in the vehicle, moves a lamp module provided on a rail to a position corresponding to the positions of the passengers, and controls the lamp module so that lamps corresponding to the positions of the passengers are turned on, being configured for providing convenience to the passengers.

Furthermore, the lamp control system for vehicles according to an exemplary embodiment of the present disclosure may change the position of the lamp module and turning-on of the lamps of the lamp module based on an illumination mode input through an input unit configured to reflect a passenger's intention, and may thus change operation of the lamp module in various illumination modes so that the lamps are turned on in one selected from the various illumination modes, desired by a passenger, improving passenger's satisfaction.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In an exemplary embodiment of the present disclosure, each operation described above may be performed by a control device, and the control device may be configured by a plurality of control devices, or an integrated single control device.

In an exemplary embodiment of the present disclosure, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A lamp control system for a vehicle, the lamp control system comprising:
   a rail provided on a roof of the vehicle and extending in a longitudinal direction of the vehicle;
   a lamp module slidably connected to the rail to slide in a direction of extension of the rail, and including lamps configured to emit light to an interior of the vehicle;
   a sensing unit configured to detect a number of passengers riding in the vehicle, positions of the passengers or a position of cargo loaded in the vehicle; and
   a controller electrically connected to the lamp module and the sensing unit and configured to control operation of the lamp module based on the number of the passengers, the positions of the passengers or the position of the loaded cargo, detected by the sensing unit,
   wherein the lamp module includes a connector slidably coupling the lamp module to the rail,
   wherein power input units extending along the rail in the longitudinal direction so that power is input to the power input units and signal transmitters electrically connected to the controller and configured to transmit an operating signal of the lamp module are provided at a portion of the rail to which the connector is connected,
   wherein power receivers connected to the power input units and signal receivers connected to the signal transmitters are provided on the connector, and
   wherein the power receivers and the signal receivers are formed as rollers, and thus, when the lamp module slides on the rail, power input and control signal input are maintained through the power receivers and the signal receivers.

2. The lamp control system of claim 1,
wherein an insert space configured so that the lamp module and the connector are inserted thereinto is provided in the rail,
wherein the connector includes engaging portions protruding outwards to protrude in a direction intersecting the longitudinal direction at an inlet of the insert space, and
wherein the connector is rotated after being inserted into the insert space so that the engaging portions are disposed in a direction intersecting a longitudinal direction of the rail inside the insert space and is thus engaged with the insert space of the rail, and thereby, the connector is coupled to the rail.

3. The lamp control system of claim 2, further including:
an actuator provided on the rail and connected to the lamp module through the connector to slide the lamp module on the rail in the longitudinal direction of the rail,
wherein the controller electrically connected to the actuator is configured to control the actuator to slide the lamp module on the rail based on the number of the passengers, the positions of the passengers or the position of the loaded cargo, detected by the sensing unit.

4. The lamp control system of claim 3,
wherein the actuator includes a driving motor configured to rotate an output shaft, pulleys, at least one of which is connected to the output shaft of the driving motor, and driving belts wound on the pulleys; and
wherein the connector includes belt rollers engaged to the driving belts.

5. The lamp control system of claim 4,
wherein the driving belts are disposed to extend in the longitudinal direction of the rail by a pair of the pulleys provided at first and second end portions of the driving belts; and
wherein the belt rollers include upper rollers coupled to upper portions of the driving belts, and lower rollers coupled to lower portions of the driving belts.

6. The lamp control system of claim 5,
wherein the insert space configured so that the lamp module is inserted thereinto is provided in the rail, and
wherein the upper rollers are coupled to the lamp module so that rotation shafts of the upper rollers are rotated in the direction intersecting the longitudinal direction of the rail, and are rotated to be connected to the rail after being inserted into the insert space.

7. The lamp control system of claim 5,
wherein the lower rollers provided such that lengths of rotation shafts thereof are adjusted are inserted into the insert space in a state in which the lengths of the rotation shafts are reduced, and then, the rotation shafts of the lower rollers extend to positions corresponding to the driving belts.

8. The lamp control system of claim 6, wherein a first elastic body is provided between the connector and the rotation shafts of the upper rollers to apply elastic force upwards, and a handle configured to pass through the lamp module and connected to the rotation shafts of the upper rollers is provided to rotate the upper rollers.

9. The lamp control system of claim 7, wherein each of the lower rollers includes a second elastic body provided between a corresponding one of the lower rollers and the connector to apply elastic force in a direction of extension of a rotation shaft of the corresponding one of the lower rollers.

10. The lamp control system of claim 1, wherein the connector includes:
a coupling portion provided in a direction intersecting the longitudinal direction of the rail and configured to open an inlet of the connector when the connector is connected to the rail; and
a third elastic body provided between the coupling portion and the connector and configured to narrow the open inlet by elasticity to fix coupling between the rail and the connector.

11. The lamp control system of claim 1, wherein at least one direct lamp configured to emit light downwards or at least one indirect lamp configured to emit light so that the emitted light is reflected by an internal trim of the vehicle are provided in or on the lamp module.

12. The lamp control system of claim 11, wherein a plurality of direct lamps or a plurality of indirect lamps is disposed depending on a kind of the vehicle to which the lamp control system for the vehicle is applied or a number of seats in the vehicle.

13. The lamp control system of claim 11, further including an input unit configured so that an illumination mode is input thereto,
wherein the controller is configured to control operation of the at least one direct lamp or the at least one indirect lamp depending on the illumination mode input through the input unit.

14. A method for controlling the lamp control system of claim 1, the method comprising:
detecting the number of the passengers riding in the vehicle, the positions of the passengers or the position of the cargo loaded in the vehicle; and
controlling, by the controller, operation of the lamp module based on the number of the passengers, the positions of the passengers or the position of the loaded cargo, detected in the detecting the number of the passengers, the positions of the passengers or the position of the loaded cargo.

15. The method of claim 14,
wherein the lamp module includes at least one direct lamp configured to emit light downwards or at least one indirect lamp configured to emit light so that the emitted light is reflected by an internal trim of the vehicle,
wherein the method further includes receiving an illumination mode, and
wherein, in the controlling the operation of the lamp module, operation of the at least one direct lamp and the at least one indirect lamp is controlled based on the received illumination mode.

16. The method of claim 14, further including:
controlling operation of an actuator coupled to the lamp module and configured to slide the lamp module on the rail, to move the lamp module based on the number of the passengers, the positions of the passengers or the position of the loaded cargo, detected in the sensing the number of the passengers, the positions of the passengers or the position of the loaded cargo.

17. The method of claim 15, wherein in the controlling the operation of the lamp module, the at least one indirect lamp is operated when the received illumination mode is a first level, the at least one direct lamp is operated when the received illumination mode is a second level, and the at least one indirect lamp and the at least one indirect lamp are operated when the received illumination mode is a third level.

* * * * *